SIGNAL OPERATED AUTOMATIC COLOR CONTROL CIRCUITS

Filed April 27, 1951

INVENTORS:
ALFRED C. SCHROEDER
& DALTON H. PRITCHARD

BY [signature]
ATTORNEY

Patented June 15, 1954

2,681,379

UNITED STATES PATENT OFFICE 2,681,379

SIGNAL OPERATED AUTOMATIC COLOR CONTROL CIRCUITS

Alfred C. Schroeder, Feasterville, Pa., and Dalton H. Pritchard, Princeton, N. J., assignors to Radio Corporation of America, a corporation of Delaware Application April 27, 1951, Serial No. 223,258

14 Claims. (Cl. 178—5.4)

This invention relates to circuits for automatically switching between two modes of operation and in particular it relates to means for automatically turning on and off color control circuits in television apparatus upon the corresponding arrival of incoming color or black and white television signals.

In color television signals there are provided color identification waveforms or flags which are used for identifying and synchronizing the transmitted color video information. In multiplex color, a color control signal or color "burst" as it is sometimes called is included at the beginning of each scanning line to provide the proper color at the television receiver. In compatible systems of color television, such as that described in the RCA Review, December 1949 in the article entitled, "A Six-Megacycle Compatible High-Definition Color Television System," these color flags may comprise "bursts" of high frequency sine wave energy following each horizontal synchronization pulse and located upon the back-porch of the blanking pulse pedestal.

The burst may comprise a sine wave having a frequency in the order of 3.8 megacycles, the phase of which is used for color phase comparison in the receiver. The proper color phasing is controlled by a color phasing oscillator in the receiver. However, if the color phasing oscillator in the receiver is permitted to operate when the color receiver is tuned to a transmitter broadcasting only black and white type signals, the phasing oscillator will not be synchronized, and varying moire patterns are caused by the receiver color phasing oscillator beating with the signal and noise components of the incoming television signal.

In order to eliminate this effect in multiplex color systems and to automatically switch the receiver for both color and black and white operation in non-compatible systems, it is desirable to turn off the color phasing oscillator or channel control circuit or to otherwise switch the color control channel circuit components in the absence of color phasing pulses. It is also desirable for similar reasons in any other type of color system to automatically turn off the color control channel when a standard black and white signal is being received which does not contain a color burst or other color identification waveform.

The present invention is directed to an improved and simplified system, for automatically controlling the operation of a color channel in accordance with an incoming signal.

As indicated above, the incoming color flag may comprise a high frequency burst of sine wave energy. It is well known in the art that circuits for amplifying the high frequencies found in these bursts have limited gain and provide less stable operation than amplifiers operating in lower frequency ranges.

In accordance with the present invention a color switching circuit is provided which is operable in accordance with the fundamental burst repetition frequency, which may be of the order of 15,750 cycles rather than 3.8 megacycles. Thus, improved operation is obtained by providing a circuit which operates as both a signal detector for separating the color flag from the other synchronizing pulses and a switching circuit simultaneously. Such a circuit may be directly connected without an intermediate amplifier to a synchronization separation circuit wherein unused portions of the incoming signals are discarded. Essentially the entire color identification energy is thus available at the switching circuit without amplification to provide more consistent switching operation than otherwise generally available.

In automatic signal operated color control circuits, stable operation is imperative, so that color circuits may be maintained in operation during periods of low signal strength and high noise conditions. Therefore in accordance with the invention a stabilized cathode follower type circuit is provided which operates throughout a wide range of signal conditions. In addition, the switching circuit is connected to operate the color channel circuits only when color signals are received, so that the television system may be operated for black and white pictures without relying upon the color switching circuit in the absence of incoming color signals. This is advantageous because any failure of the color switching circuit will tend only to remove the color information and black and white intelligible pictures will still be available from compatible signals, and because a circuit providing more effective switching control is thus made possible by utilizing a relatively small proportion of the incoming color waveform energy. In this manner signal strength variations and noise conditions are prevented from appreciably disturbing the color control circuit operation.

In accordance with the present invention there is provided a gated detector or coincidence amplifier operating in accordance with two input signals, one of which is the color identification waveform and the other of which is a gating signal. The use of the gating signal provides automatic switching circuits operable from incoming signals having a low energy level and precisely switching even under conditions of varying signal strength and high noise pulses. Output signals from the coincidence amplifier may be positive in sense and thereby used to unblock a succeeding biased color control tube. Limiting of the output signals is effected to not only afford improved operation by causing complete switching control while the signal strength varies over any range larger than that required to operate the limiting circuit but will also prevent grid current flow and distortion in the succeeding color control tube.

In accordance with a further phase of the present invention, the coincidence amplifier itself consists of a cathode follower type circuit which is utilized to provide good signal isolation, improved impedance matching and a more linear output signal to afford positive switching control not heretofore possible. A plurality of functions is therefore provided in a single simplified switching circuit which though inexpensive affords improved operation.

It is therefore an object of the invention to provide stable and improved automatic switching control circuits for color television systems, or the like, operable by incoming signals.

It is another object of the invention to provide simplified automatic switching circuits which are inexpensive to construct and yet provide improved stable switching control.

It is a further object of the invention to provide automatic switching control circuits for color television systems, which circuits are operable within relatively low frequency ranges corresponding to color identification waveform fundamental frequencies, thereby affording a stabilized high gain and positive switching action.

It is a still further object of the invention to provide a single simplified color control circuit affording a plurality of improved operating functions and operable from incoming signals having a low energy level to provide precise switching even under conditions of varying signal strength and high noise pulses.

Other objects and advantages of the invention will be found throughout the following description, wherein the construction and mode of operation of the invention will become apparent when considered in connection with the accompanying drawings, in which.

Figure 1:
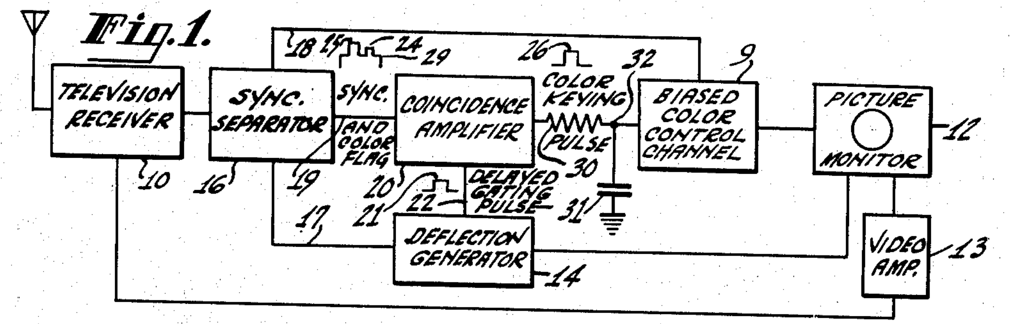
Figure 1 is a block diagram of a compatible color television receiving system embodying one form of the present invention.

Throughout the respective figures of the drawing, like reference characters are used to designate like circuit components. Referring now in particular to Figure 1, the block diagram circuit comprises a color control switching circuit operable from signals received by the television circuit 10 to automatically provide at the picture monitor 12 either color or black and white pictures depending upon the characteristics of the incoming signal to which the television receiver 10 is tuned.

A video amplifier 13 is provided which is operable for either normal or color signals to provide at the picture monitor the necessary video intelligence. Similarly a deflection generator 14 operates the scanning circuits of the picture monitor 12 for either black and white or color signals, in this preferred embodiment which represents a compatible system. It is to be recognized, however, that the color control switching circuits operated in accordance with this invention by incoming signals might be used for switching deflection circuits or any other necessary circuit components in the color control channel from one mode of operation to another.

A synchronization pulse separator circuit 16 provides at one output lead 17 signals for properly synchronizing the deflection generator circuit 14, and in addition provides along the further output lead 18 separated color identification waveforms for use in the color control channel 9. As before indicated, the separated color waveforms may be used in addition for proper phasing of the color control circuits if desired, but the present invention, although affording advantageous operation in a system operating in such a manner, such as a dot multiplex color television system, need not be limited in operation to any particular proposed system.

The synchronization separator 16 in addition is directly connected by lead 19 to a coincidence amplifier circuit 20. This circuit is operable only upon concurrent reception of a color identification waveform from the synchronization separator and a gating pulse. This gating pulse may comprise a delayed synchronization pulse 21 which is taken from a suitable circuit connection in the deflection generator 14 by the lead 22. The delayed synchronization pulse 21, which is readily obtainable from an already existing connection in the deflection circuit generator 14 without the provision of separate delay circuit, then coincides in time with the color waveform 24 and is preferably of higher amplitude, as will be later explained.

The color identification waveform 24 is spaced in time a small amount from a horizontal synchronization pulse 25 on the "backporch" of the blanking pulse pedestal 29. The delayed gating pulse 21 therefore represents the synchronization pulse 25 as derived from the deflection generator circuit at a circuit position providing a time delay equal to the separation in time of the identifying waveform 24 and synchronizing signal 25 and preferably somewhat amplified. It is readily recognized therefore that the delayed pulse, which operates as a gate so that an output switching or color keying pulse 26 is provided from the coincidence amplifier 20 only upon concurrent input of the color identifying waveform 24 and delayed gating pulse 21. The gating pulse 26 alone is provided when a black and white television signal is received having no color identification pulse 24 and the output switching pulse 26 therefore is not developed. Thus, switching or keying is automatically operated in accordance with the nature of incoming signals.

It is noted that, as shown in the drawing, the color identifying waveform 24 may represent a direct current component of a high frequency burst of 3.8 megacycle energy having a direct current axis above the top of the blanking pedestal 29. This waveform will have a time repetition rate or fundamental frequency of 15,750 cycles per second, in accordance with the presently adopted standards, where one waveform is superimposed upon each horizontal blanking pulse pedestal immediately following the horizontal synchronization pulse, as shown. Thus, a keying circuit may be provided for low frequency operation at the fundamental pulse frequency, thereby affording the many advantages in design and operation of low frequency amplifiers as compared with high frequency amplifiers known to those skilled in the art.

In the output circuit of the coincidence amplifier 20 is a decoupling network comprising the resistor 30 and capacitor 31. This network is chosen to have a time constant long compared with that of the output color keying or switching pulse 26 so that a substantially constant direct current potential suitable for biasing succeeding controlled circuits such as amplifier tubes may be obtained at the capacitor terminal 32. Thereby if the color control channel 9 is negatively biased to cut off, the direct current voltage at terminal 32 may become enough positive to overcome the negative bias. Uninterrupted operation of the color control channel throughout any time period that the input color identification pulses 24 arrive at the coincidence amplifier switching circuit 20 is provided in this manner.

Operation details of the coincidence amplifier circuit in providing automatic color switching may be described in connection with the schematic circuit diagram of Figure 2. At the input terminal 40 input pulses 24 and 25 are obtained from a synchronization separator circuit which removes from a composite signal the video portion of the signal, which is unnecessary for providing color switching control. The color identifying waveform 24 will be present at the input terminal 40 only when color signals are present, and will have a fundamental frequency of 15,750 kilocycles, if it follows each horizontal synchronization pulse 25, as shown. The amplitude of the direct current component of the color pulse when it comprises a 3.8 megacycle sine wave burst, or the like, will be above the top of the blanking pedestal 29, and will be approximately equal to the average value of the 3.8 megacycle sine wave burst signal. The pulse 24 therefore represents the direct current component of the color identification waveform as it appears at terminal 40, since the synchronization separator circuits do not respond to frequencies in the range of 3.8 megacycles and pass only the direct current component at the 15,750 kilocycle fundamental frequency. Accordingly, the circuit of the present invention may be operated at a relatively low frequency directly from the synchronization separator circuit, even when high frequency color flag bursts are present.

The color identification waveform 24 appears at terminal 40 with positive polarity and is applied at the anode 41 of the coincidence amplifier tube 42 through the resistance-capacitance coupling network 43, 44, 48. Input signals at the anode 41 of the tube 42 therefore comprise the positive voltage pulses developed across resistor 44, since the resistance 44 comprises part of a resistance network 44, 45 connected between the anode 41 and the cathode 46. A signal reference point or ground connection is established at an intermediate point 47 on the network by the capacitor 48. Accordingly the resistance network comprises an output impedance 45 between the cathode 46 and ground, and an input impedance 44 between the anode 41 and ground. The input impedance 44 is small as compared with the output impedance so that the tube conduction voltage drop across the input impedance 44 will be small.

Figures 3, 4, 5:
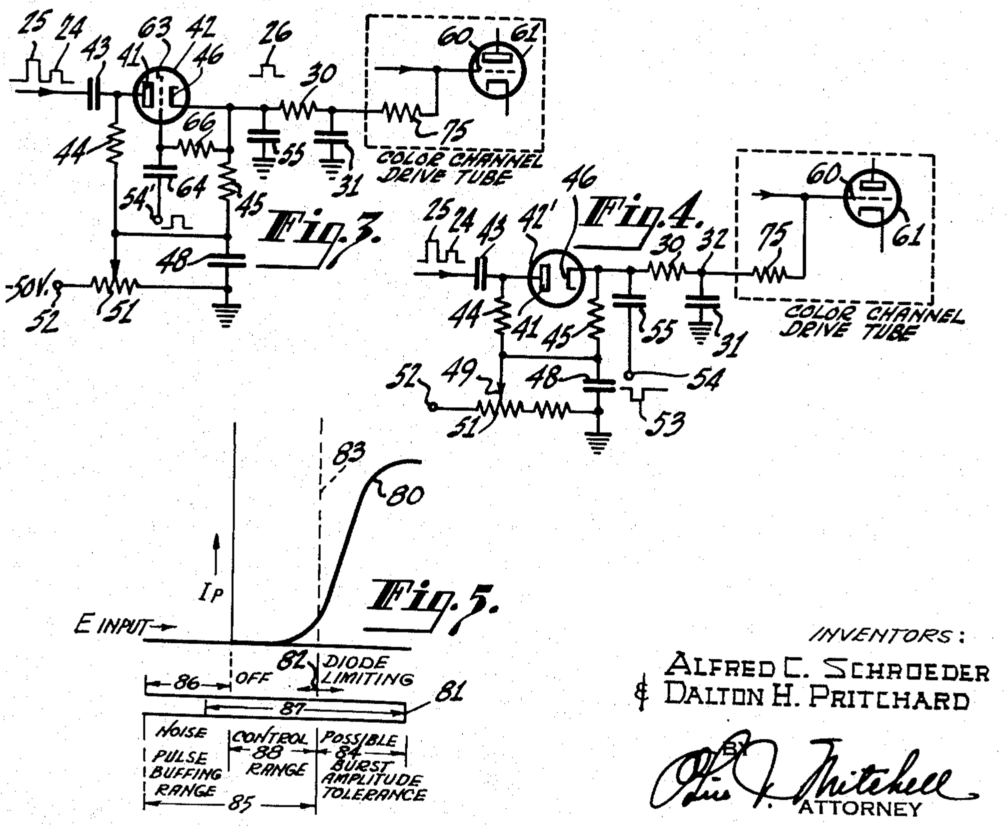
Figures 3 and 4 are schematic diagrams of color control circuits including further phases and modifications of the invention; and, Figure 5 is a graphical representation of operating characteristics which may be attained in accordance with the invention.

A threshold control means 49 is provided for selecting a predetermined value of cut-off bias potential on the succeeding stage, which must be overcome by conduction of the tube 42 in presence of coincident input signals to effect conduction in the succeeding stage. This threshold control is connected to the intermediate point 47 on the resistance network and comprises the tap 49 of a variable resistor 51. Therefore, the voltage divider resistance network between a negative voltage terminal 52 and ground is not in the conductive signal path of the tube 42, and does not disturb operation of this tube because it establishes both the anode 41 and cathode 46 at the same potential. Therefore neglecting other conditions for the moment, and assuming the tube 42 operates as a diode as shown in Figure 4, the tube 42 remains free to conduct whenever the anode goes positive in the presence of the input waveforms 24 and 25. The threshold control is set to such a position however, that the tube 42 cannot provide an output pulse across the resistor 45 of sufficient amplitude to overcome the cut-off bias for the succeeding stage by conduction due to the anode input waveforms alone.

A second input signal is provided therefore to cause the tube 42 to develop an additional voltage across resistor 45 in opposition to the bias voltage and of high enough potential to add to that caused by the anode input waveforms to unblock the succeeding stage. This signal comprises a negative gating pulse which, as hereinbefore noted, may be derived from the horizontal synchronization pulse by an electronic transfer circuit such as a deflection generator circuit providing a delay time such that it coincides with the color identification waveform 24. In diode operation the coincidence need not be critical because the energy of each of the pulses 24, 25 and 53 is necessary to unblock the succeeding tube.

The gating pulse 53 is applied at terminal 54 and is inserted at the cathode impedance 45 by means of capacitor 55. The effective direct current voltage between the cathode 46 and ground, appearing as the difference between the voltage at the control tap 49 and the voltage drop across resistor 45 may be determined by the ratio of resistors 44 and 45 along with the characteristics of tube 42, and will be chosen to effect cut off at the succeeding stage when only the synchronization pulse 25 and gating pulse 53 are present at the tube 42. However, when the additional color waveform 24 arrives, its entire effective voltage component, excepting the small voltage drops across the tube 42 and resistor 44, will appear across resistor 45 to bring the voltage at the cathode 46 above cut-off voltage for the succeeding stage.

Since the negative gating pulse on the cathode 46 and the positive color waveform on the anode 41 both have the same effect of causing anode current to flow in tube 42, the threshold control means 49 may be variably adjusted to select the position at which the combined level of output signals across resistor 45, effectively caused by the difference between the amplitudes of the negative gating pulse and the positive color identification waveform, will allow conduction of the amplifier 42 to provide a positive switching pulse 26 across the output impedance 45 of enough amplitude to overcome the bias at resistor 51.

This operation of tube 42 as a diode is entirely suitable when enough energy is available in the color identification waveform to bring the effective direct current voltage at the cathode 46 to the proper value. If the energy is smaller, however, or signal strength fluctuations and high amplitude noise pulses are present, the tube 42 may be operated in effect as a triode amplifier to derive a large portion of switching energy from the gating pulse 53 rather than the color waveform 24. In this case the negative gating pulse is preferably larger in amplitude than the color identification input waveform, so that positive switching may be obtained by the coincidence amplifier tube 42 even with large amplitude variations of the identification waveform 24, as will hereinafter be explained in more detail.

As will be later explained in connection with triode operation, the conduction tolerance range of the tube 42 may better be effected with proper selection of the threshold bias voltage and tube parameters to provide both an upper and lower buffing range, thus avoiding erratic switching with noise pulses or low amplitude signals. In this manner, considerable variation in the amplitude of the identifying signal may be tolerated without disturbing the automatic switch operation because of the upper buffing range. Likewise, a lower buffing range may be provided to allow a considerable amplitude variation tolerance in noise pulses, which otherwise might possibly disturb the automatic switching operation.

In either diode or triode operation the hereinbefore described decoupling network 30, 31 is connected between the control electrode 60 of a succeeding color channel drive tube 61 and the output impedance 45. The decoupling network has a time constant long compared to the fundamental frequency of the output signal pulses 26 from the switching tube, so that uninterrupted operation of the drive tube is obtained whenever color identification pulses of high enough amplitude to overcome the bias at the threshold tap 49 appear at the cathode output resistor 45 of the coincidence amplifier tube 42.

When the coincidence amplifier tube 42 operates as a triode, as shown in Figure 1, the control electrode 63 is effectively held at signal ground potential by means of a capacitor 64. The signal voltage derived from the input gating pulse is therefore developed across the resistor 66 connected between the cathode terminal 46 of the resistance network 44 and 45 and the control electrode 63. The input gating pulses are thereby coupled to the control electrode 63. By means of the present invention increased gain is provided by utilizing amplification potentialities of tube 42, even though no separate direct current anode supply source is used for supplying additional energy.

For this reason the time constant of the resistor 66 and capacitor 64 is large as compared with the fundamental frequency of the input pulses. Since the anode input voltage pulses are effectively grounded by capacitor 48, they will not cause a charge upon capacitor 64. However, the negative gating pulses, which are applied at a constant fundamental frequency to terminal 54 upon reception of any television signal, charge capacitor 64 to such a potential that only enough anode current will flow in the tube 42, during the time the pulse 53 is arriving, to maintain the charge upon the capacitor 64. This charge effectively blocks the tube 42 for anode current flow caused by any potential change at the anode occurring at any other time than that of the gating pulse 53, because of a neagtive potential on the control electrode 63. Therefore there is no response due to the arrival of the synchronization pulse 25 at the anode resistor 44, and the current flow in resistor 45 is so small upon arrival of the gating pulse 53 in the absence of a color waveform 24 that the direct current voltage at the cathode 46 then very nearly approaches the voltage at the control tap 49.

When a color signal 24 appears, however, it coincides with the gating pulse 53 at the time the grid 63 is slightly positive and the tube 42 conducts heavily, causing effectively the entire amplitude of the color waveform 24 to appear across resistor 45. This results in a much larger change in the switching potential available at the cathode 46 from the input color pulses 24, and amounts to amplification by the tube 42. Thus, a color waveform of five volts amplitude might readily change the voltage on the succeeding stage from cutoff to conduction with a high degree of stability. It is clear therefore, that variations of amplitude of the color waveform 24 would be tolerable over wide ranges without causing erratic switching operation, in this embodiment of the invention.

Larger switching control pulses 26 are thus provided at the output impedance 45 than would be possible by diode action alone. It is noted that the ratio of the impedances 44 and 45 respectively appearing between the ground reference point, the anode 41 and the cathode 46, is also preferably small in this embodiment. This is to substantially prevent the effect of conduction of the tube 42 through the anode input impedance 44 upon impression of the color waveform 24 from developing a high enough voltage drop to disturb the output current of the tube 42. Since resistor 45 is not bypassed, the circuit is therefore effectively connected as a cathode follower, providing good linearity of output pulses and effectively isolating input and output signals.

To provide more stable operation over a large range of input signal amplitude, most of which might result from variations in the color identification pulse amplitude, a diode connected limiter tube 70 may be used to effectively maintain the output terminal 32 of the coincidence amplifier 42 at ground potential during conduction. The anode 71 of the limiter tube 70 is effectively connected to the grid 60 of the color channel drive tube thus keeping it from going positive, and establishing it at ground potential when the potential at terminal 32 goes positive with respect to ground. Thus with normal input signal amplitudes, the threshold control 49 is set such that the combined amplitudes of the gating pulse and the color identification signal will normally cause enough positive voltage drop across resistor 45 to overcome the negative bias at the tap 49 and cause the diode 70 to conduct.

In this manner the grid 60 of the drive tube 61 will not be overdriven at the peaks of the output pulses 26 or when a positive potential is provided at terminal 32, and yet the same level of switching voltage will be applied when the input signal amplitude falls off substantially. Positive switching control is therefore maintained over even larger ranges of signal variation than possible with the coincidence amplifier circuit alone.

When the diode 70 is not conducting, the color channel drive tube 61 has a grid impedance network comprising a direct current path to ground through series resistors 75, 30, 45 and 51. The negative polarity terminal 52 on the potentiometer 51 is provided for connecting a bias source of sufficient voltage to cut off the drive tube 61 by the voltage drop across the portion of resistor 51 in the direct current path. Thus, the color channel tube is normally non-conducting in the absence of a color waveform 24. The switching tube 42, however, when operated by input color signal pulses 24, develops across its output impedance 45, commonly connected in said biasing network, positive pulses which overcome the bias and thus provides for conduction of diode 70 and effective grounding of the grid 60. Switching control is therefore effected directly in the direct-current grid path of the drive tube.

Since the color channel drive tube is blocked until color signals arrive at the television receiver, television apparatus in which it is connected would function in absence of drive tube conduction for black and white operation. In the event of any circuit failure when a color signal is present, only the application of color information would be prevented, rather than complete failure of the television system, as would be the case should the drive tube 61 not be biased to cutoff. For this reason the tube is preferably non-conductive under normal conditions when black and white signals are received, although converse operation might be provided within the scope of the invention. In either case moire patterns and beat patterns between video signals and color control circuit voltages would be eliminated in absence of a color signal, by means of the automatically operated keying circuit of this invention.

The cathode 46 of the coincidence amplifier tube 42 is kept near ground potential by conduction of the diode limiter tube 70 because little current flows in resistor 30. Likewise, the anode 41 is held at a negative value with respect to ground, because of the small potential drop across resistor 44, at an amount depending upon the setting of the threshold control 49. Therefore, the tube 42 is biased to such an extent that neither the incoming positive horizontal synchronization pulse 25, or the color identification pulse 24 can by itself drive the anode 41 sufficiently positive to cause conduction of the coincidence amplifier tube 42. When the color waveform 24 ceases, therefore the negative bias will no longer be overcome and the drive tube 61 will be blocked, and the diode 70 will cease to conduct.

During arrival of both the gating pulse 53 and the color waveform 24 at the same time, however, the identification waveform 24 drives the anode positive, while the delayed synchronization pulse is driving the cathode 46 negative and the negative bias on tube 42 is overcome to allow current flow through the tube 42.

The control electrode 63 is maintained at signal ground potential by the capacitor 64, and the grid, because of the charge on this capacitor 64 afforded by the negative gating pulse 53, therefore assumes a positive direct current bias with respect to the cathode. This action effectively increases the amplification of the tube, even though no anode supply voltage is provided in the manner hereinbefore described. It is to be recognized that the very small breakdown potential of the diode limiter 70, of the presently described embodiment, is easily overcome when a small amplitude color waveform 24 is received thereby connecting the control electrode 60 of the color drive tube to direct current ground and permitting normal conduction of the drive tube 61. When conduction of the diode 70 ceases, however, effectively the entire threshold potential at the variable threshold control tap 49 will be applied at the control electrode 60 to quickly cut off the color channel drive tube.

Figure 2:
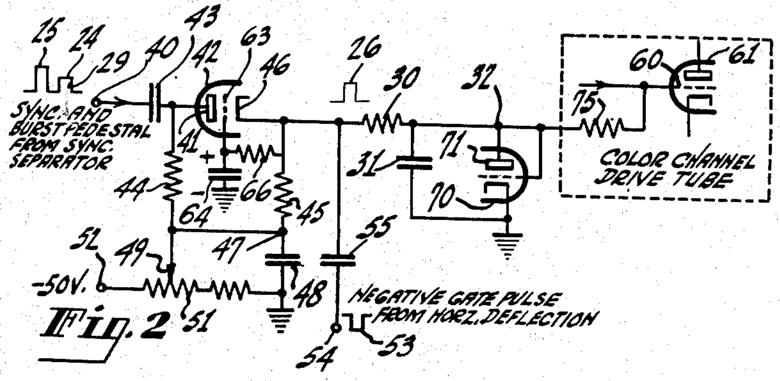
Figure 2 is a schematic circuit diagram illustrating circuit details of one embodiment of the automatic switching circuit of the invention.

The embodiment of the invention as shown in Figure 3 is similar to that of Figure 2 except that the gating pulse is positive and is applied at the terminal 54′ to the control electrode 63 of the coincidence amplifier 42. In this circuit the amplitude of the positive gating pulse which is developed between the control electrode 63 and ground is bypassed around the output impedance 45 by capacitor 55. Therefore the gating pulse itself because of its now positive polarity will not effect switching of the color channel drive tube 61 by a potential drop across resistor 45, but only the potential developed across resistor 45 by the anode current of tube 42. Operation of this circuit is essentially identical to that of Figure 2.

When high gain is desirable in the switching circuit triode amplifiers such as those described are preferable. However, the invention is not limited to a triode coincidence amplifier 42 as hereinbefore discussed in connection with the embodiment of Figure 1. Thus, as shown now in Figure 4, the diode 42′, which does not amplify but which for purposes of simplicity is referred to generally as a coincidence amplifier, performs in a manner like that hereinbefore described.

In both the circuits of Figures 3 and 4, the limiting diode 70 is not shown. Limiting action, nevertheless, may be maintained in these circuits since the potential at terminal 32 is positive and will be of sufficient amplitude to cause the control electrode 60 of the drive tube to draw grid current. Thus, the grid-to-cathode current path acts to establish grid 60 near ground potential in the same manner as the diode limiter of Figure 2. It is preferable, however, to use the diode limiter 70 to prevent any distortion in the color control channel or the drive tube 61 because of operation in the grid current region.

The waveform illustration of Figure 5 is shown to more generally illustrate how the circuit of the invention provides improved operation even when large signal variations and noise pulses are present. A curve 80 represents the plate current characteristic of the coincidence amplifier tube 42 when an input voltage pulse 81, representing the difference of the combined amplitudes of the color waveform 24 and the gating pulse 54, is applied. The dotted line 83 represents the amount of coincidence amplifier signal necessary to cause the diode 70 to conduct. By means of the threshold control 49 the conduction current of the diode limiter tube 70 may be varied, as indicated by the arrow 82, by effectively moving the diode limiting position 83 to the left or right with respect to the waveform 81. In addition the respective input amplitudes of the color waveform 24 and the gating pulse 54 may be varied to some extent to cause proper diode limiter conduction by determining the overall amplitude of pulse 81.

It is seen then that the possible burst amplitude or color waveform amplitude change tolerable without disturbing the switching operation is indicated between the limits 84. Likewise a noise pulse of the amplitude represented between the limits 85 is necessary before it is possible to cause erratic switching. Normally the noise pulses are sharp narrow pulses which do not contain enough energy or duration to effect the switching operation even if they exceed the limits of the noise pulse buffing range 85. Even a small amount of coincidence amplifier tube current due to noise pulses therefore is not objectionable because of the filtering action of the decoupling circuit 30, 31, which has a long time constant.

The maximum amplitude of the synchronization pulses 86, as represented at the lower portion of the waveform 81, alone will not be enough to cause a switching voltage output pulse 26. The portion 87 of the input pulse 81 may be attributed to the gating pulse 54 and the remainder to the color waveform 24. As before explained, this alone cannot cause operation of the diode limiter, even though greater in amplitude than the synchronization pulse 26. Thus, only the control range portion 88 of the signal is effective in providing proper switching operation. Accordingly, it is seen that a very large range of tolerance is available in the keying circuits of the invention before the positive switching action and uninterrupted color operation upon arrival of a color waveform will be disturbed.

As before explained, the negative gating pulse 87 is preferably much larger in amplitude than the color waveform 86. The gating pulse, even at very high amplitudes causes only a small conduction of the amplifier 42. A high amplitude pulse therefore effectively supplies energy for amplification of the color waveform 86 without an anode supply voltage for the tube 42.

It is therefore to be recognized that in accordance with the present invention there is provided a simplified and improved circuit, which operates to provide precise switching control, and which in combination with a color television system will automatically cause circuit changes for viewing either color or black and white signals when the corresponding input signals are received.

What is claimed is:

1. In a television system having deflection circuits adapted for operation to provide either color or black and white pictures corresponding to separate incoming signals, the color signals having an identifying waveform separable from the picture intelligence and normal synchronizing signals, an automatic color control circuit comprising, a circuit for separating said identifying waveform from incoming color signals, a picture reproducing device normally operable for reproducing black and white pictures, a color control circuit for operation with said reproducing device to provide color pictures rather than black and white, a circuit for providing a bias potential for said color control circuit to prevent operation thereof in the absence of signals overcoming the bias, means to provide a potential for overcoming said bias including a coincidence amplifier, means connected for providing one input pulse to said amplifier comprising said identifying waveform after separation and means connected for providing another input pulse to said amplifier comprising gating signals derived from said synchronizing signals so that said amplifier provides said potential for overcoming the bias only upon coincident arrival thereat of said identifying waveform and said gating signals, whereby the color control circuit coincidence amplifier automatically switches said receiver circuit for either black and white or color picture operation.

2. A color control circuit as defined in claim 1 wherein said identifying waveform is spaced in time from said synchronizing signals, a circuit connects said separating circuit to directly supply said separated identifying waveform to said concidence amplifier, and said synchronizing signals are derived from a normal circuit connection in the deflection circuits of said systems, thereby providing a time delay equal to the separation in time of the identifying waveform and the synchronizing signals and affording coincident amplification in said amplifier.

3. In color television apparatus an automatic color control switching system comprising a gating amplifier circuit having a pair of input signals, an output impedance in said amplifier circuit across which is developed a direct current potential in accordance with gated signals passed by said amplifier circuit, a bias circuit for providing a potential in opposition to that developed by said gated signals across said output impedance, means for applying said biased circuit potential to said output circuit, and means for relatively controlling the amplitude of said bias for controlling the stability of circuit operation.

4. A system as defined in claim 3 wherein said amplifier has an output signal coupling circuit and an amplitude limiter circuit connected thereto to provide even more stability of operation.

5. A system as defined in claim 3 wherein one of said pair of signals comprises a gating pulse, and said output impedance and bias circuits are serially connected in the input bias circuit of a following color channel drive tube having a control electrode.

6. A diode gating amplifier and automatic switching circuit comprising in combination, an impedance network between the anode and cathode of said diode, an input signal applied to said anode, a gating signal applied to said cathode, a signal reference point established on said network at a point whereby the cathode impedance portion to which said gating signal is applied is larger than the anode impedance portion to which said input signal is applied, and an output circuit coupled to at least a portion of the cathode impedance network portion, whereby variations of said input signal are substantially ineffective in disturbing the switching signals provided at said output circuit.

7. In television apparatus adapted for both color and black and white operation, an automatic color control circuit comprising in combination a color channel signal drive tube having an input control electrode, a grid impedance network comprising a direct current path connecting said control electrode to a ground reference point, terminals for a cut-off bias source connected in said path, and a switching tube operated by input color signal pulses and having an output impedance device commonly connected with said network, adapted to conditionally supply control signals in opposition to said cutoff bias.

8. A circuit as defined in claim 7 having a decoupling network connected between said control electrode and said output impedance device with a time constant long compared to the input signal pulses for said switching tube whereby steady, uninterrupted operation of said drive tube is obtained throughout any period that the input signal pulses operate the switching tube.

9. A circuit as defined in claim 7 wherein the input signal pulses are obtained from a synchronization separation circuit in said television apparatus, whereby the signal pulses obtained substantially have the portions unnecessary for providing color switching control removed and therefore the switching circuit efficiency is improved.

10. An automatic color control circuit and color flag detector for color flag signals of the type comprising a burst of high frequency signals superimposed upon video synchronizing signals, a coincidence amplifier of the cathode follower type having an anode impedance and a cathode impedance, means for applying video synchronizing signals to said anode impedance, means for applying other signals to be compared to said cathode impedance, and a low pass filter circuit connected with said cathode impedance to form an output circuit.

11. An electronic amplifier circuit for gating a pair of signals arriving in coincidence comprising in combination, an amplifier tube having a cathode, anode and control electrode, a capacitor connecting said control electrode to signal ground, a resistor connecting said control electrode with said cathode, the time constant of said resistor and capacitor being large as compared with the frequencies of said pair of signals, an impedance network connected between said cathode and anode, a circuit establishing signal ground at an intermediate position on said network, and signal input terminals connected to said impedance network on opposite sides of said intermediate position, each of said input terminals being designated to receive a respective one of said pair of signals.

12. An automatic color control circuit according to claim 10, wherein their is additionally provided an amplitude limiter circuit connected with said output circuit, whereby signal excursions in said output circuit are limited within predetermined excursion limits.

13. An automatic color control circuit and color flag detector for color flag signals of the type comprising a burst of high frequency signals superimposed upon video synchronizing signals, a coincidence amplifier of the cathode follower type including a control electrode input circuit and having an anode impedance and a cathode impedance, means for applying video signals to said anode impedance, means for applying other signals to be compared to the control electrode of said cathode follower amplifier and a low pass filter circuit connected with said cathode impedance to form an output circuit.

14. A signal coincidence detecting circuit comprising in combination: an electron discharge tube having an anode, cathode and control electrode, a resistance network connected between said anode and said cathode, a point on said network being connected to a point of signal reference, means for applying a first signal to said anode, means for applying a second signal having a recurrent component to said cathode electrode, a resistor connected between said control electrode and said cathode, a capacitor connected between said control electrode and said point of signal reference, the value of said capacitor taken in combination with said resistor being such to form a time constant in excess of the period of said second signal recurrent component.

References Cited in the file of this patent

UNITED STATES PATENTS

| Number | Name | Date |
|---|---|---|
| 2,141,343 | Campbell | Dec. 27, 1938 |
| 2,378,746 | Beers | June 19, 1945 |
| 2,428,946 | Somers | Oct. 14, 1947 |
| 2,539,440 | Labin | Jan. 30, 1951 |
| 2,546,972 | Chatterjea | Apr. 3, 1951 |
| 2,558,489 | Kalfaian | June 26, 1951 |